United States Patent
Myer (10) Patent No.: US 10,184,383 B2
(45) Date of Patent: Jan. 22, 2019

(54) VISUAL MARKING AND GEOMETRIC POKA-YOKE FOR FLUID AND ELECTRICAL LINES OF AFTERTREATMENT SYSTEMS

(71) Applicant: Cummins Emission Solutions Inc., Columbus, IN (US)

(72) Inventor: Andrew M. Myer, Greenwood, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 432 days.

(21) Appl. No.: 14/799,141

(22) Filed: Jul. 14, 2015

(65) Prior Publication Data

US 2017/0016369 A1     Jan. 19, 2017

(51) Int. Cl.
| | | |
|---|---|---|
| *F01N 3/00* | (2006.01) | |
| *F01N 13/18* | (2010.01) | |
| *B01D 53/94* | (2006.01) | |
| *F01N 3/20* | (2006.01) | |
| *F01N 13/00* | (2010.01) | |

(52) U.S. Cl.
CPC ......... *F01N 13/18* (2013.01); *B01D 53/9495* (2013.01); *F01N 3/2066* (2013.01); *B01D 53/944* (2013.01); *B01D 53/9418* (2013.01); *B01D 53/9431* (2013.01); *B01D 53/9477* (2013.01); *B01D 2251/2067* (2013.01); *F01N 13/011* (2014.06); *F01N 2260/24* (2013.01); *F01N 2610/14* (2013.01); *F01N 2610/1453* (2013.01); *Y02T 10/24* (2013.01)

(58) Field of Classification Search
CPC ... F16L 2201/60; F16L 2201/10; F01N 13/18; F17C 13/04
See application file for complete search history.

(56) References Cited

U.S. PATENT DOCUMENTS 7,328,837 B2   2/2008  Baker et al.
7,712,237 B2   5/2010  Wortley et al.
(Continued)

FOREIGN PATENT DOCUMENTS

DE   1020090 14 648    12/2010
JP   2010-106580       5/2010

*Primary Examiner* — Audrey K Bradley
*Assistant Examiner* — Anthony Ayala Delgado
(74) *Attorney, Agent, or Firm* — Foley & Lardner LLP (57) ABSTRACT

An aftertreatment system comprises an SCR system and at least one reductant insertion assembly fluidly coupled thereto. The reductant insertion assembly includes an injector and reductant storage tank. The injector includes a first fluid connector and a second fluid connector. A first fluid connector marking is defined on the first fluid connector and a second fluid connector marking is defined on the second fluid connector. The reductant storage tank includes a first fluid conduit fluidly coupled to the first fluid connector and a second fluid conduit fluidly coupled to the second fluid connector. A first fluid conduit marking is defined on the first fluid conduit, and a second fluid conduit marking is defined on the second fluid conduit. The first fluid conduit marking corresponds to the first fluid connector marking, and the second fluid conduit marking corresponds to the second fluid connector marking, thereby identifying a coupling relationship therebetween.

19 Claims, 6 Drawing Sheets

(56) References Cited

U.S. PATENT DOCUMENTS

| | | | | |
|---|---|---|---|---|
| 8,511,717 | B2* | 8/2013 | Fulmer | B60T 8/3685 |
| | | | | 285/120.1 |
| 9,523,451 | B1* | 12/2016 | Nichols | B05D 5/10 |
| 2006/0101810 | A1* | 5/2006 | Angelo | F01N 3/0253 |
| | | | | 60/286 |
| 2008/0157525 | A1* | 7/2008 | Yoshino | F16L 37/0841 |
| | | | | 285/376 |
| 2012/0211974 | A1* | 8/2012 | Richardson | A62C 33/00 |
| | | | | 285/93 |
| 2017/0018209 | A1* | 1/2017 | Walley, Jr. | G09F 3/0295 |

* cited by examiner

VISUAL MARKING AND GEOMETRIC POKA-YOKE FOR FLUID AND ELECTRICAL LINES OF AFTERTREATMENT SYSTEMS

TECHNICAL FIELD

The present disclosure relates generally to aftertreatment systems for use with internal combustion (IC) engines.

BACKGROUND

Exhaust aftertreatment systems are used to receive and treat exhaust gas generated by engines such as IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) system including at least one catalyst to convert NOx (NO and $NO_2$ in some fraction) into harmless nitrogen gas ($N_2$) and water vapor ($H_2O$) in the presence of ammonia ($NH_3$).

Aftertreatment systems used with high horse power engines (e.g., marine engines, engines included in large industrial generator sets, etc.) often required significant quantities of a reductant such as a diesel exhaust fluid for proper NOx reduction. Such aftertreatment system often include multiple reductant tanks, injectors and/or multiple SCR system banks each configured to receive and treat a portion of the exhaust gas. This leads to a large quantity of fluid lines and electrical lines that have to be routed between components. For example fluid lines have to be routed between corresponding reductant storage tanks and injectors, and electrical lines have to be routed between controllers and injectors or other sensor and injection components. In some instances, the number of fluid lines and/or electrical lines can be upwards of 100, each corresponding to different components and can lead to incorrect attachment of fluid lines or electrical lines and eventually, a failure to meet emission requirements and/or malfunction of the aftertreatment system.

SUMMARY

Embodiments described herein relate generally to systems and methods for identifying a coupling relationship between fluid conduits and fluid connectors and/or electrical leads and electrical connectors included in an aftertreatment system. In various embodiments, the systems and methods described herein include corresponding visual markings defined on fluid conduits and fluid connectors, and/or electrical leads and electrical connectors included in reductant insertion assemblies of an aftertreatment system.

In a first set of embodiments, an aftertreatment system comprises a SCR system including at least one catalyst configured to decompose constituents of the exhaust gas. At least one reductant insertion assembly is fluidly coupled to the SCR system. The at least one reductant insertion assembly includes an injector including a first fluid connector and a second fluid connector. A first fluid connector marking is defined on the first fluid connector and a second fluid connector marking is defined on the second fluid connector. The second fluid connector marking is different from the first fluid connector marking. The reductant insertion assembly also includes a reductant storage tank which includes a first fluid conduit fluidly coupled to the first fluid connector and a second fluid conduit fluidly coupled to the second fluid connector. A first fluid conduit marking is defined on the first fluid conduit, and a second fluid conduit marking is defined on the second fluid conduit. The second fluid conduit marking is different from the first fluid conduit marking. The first fluid conduit marking corresponds to the first fluid connector marking, thereby identifying a coupling relationship therebetween. Furthermore, the second fluid conduit marking corresponds to the second fluid connector marking, thereby identifying a coupling relationship therebetween.

In another set of embodiments, a reductant insertion assembly for inserting a reductant into an aftertreatment system comprises an injector which includes a first injector fluid connector and a second injector fluid connector. A first injector fluid connector marking is defined on the first injector fluid connector and a second injector fluid connector marking is defined on the second injector fluid connector. The second injector fluid connector marking is different from the first injector fluid connector marking. The reductant insertion assembly also includes a reductant storage tank which includes a first injector fluid conduit fluidly coupled to the first injector fluid connector and a second injector fluid conduit fluidly coupled to the second injector fluid connector. A first injector fluid conduit marking is defined on the first injector fluid conduit and a second injector fluid conduit marking is defined on the second injector fluid conduit. The second injector fluid conduit marking is different from the first injector fluid conduit marking. The first injector fluid conduit marking corresponds to the first injector fluid connector marking, thereby identifying a coupling relationship therebetween. Furthermore, the second injector fluid conduit marking corresponds to the second injector fluid connector marking, thereby identifying a coupling relationship therebetween.

In yet another set of embodiments, a method for facilitating fluid coupling of a reductant insertion assembly and electrical coupling of a controller included in an aftertreatment system comprises providing a first fluid conduit of a reductant tank of the insertion assembly having a first fluid conduit marking defined thereon. A second fluid conduit of the reductant tank is provided which has a second fluid conduit marking defined thereon. The second fluid conduit marking is different from the first fluid conduit marking. A first fluid connector of an injector of the reductant insertion assembly is provided which has a first fluid connector marking defined thereon. A second fluid connector of the injector is provided which has a second fluid connector marking defined thereon. The second fluid connector marking is different from the first fluid connector marking. The first fluid conduit marking of the first fluid conduit is aligned with the first fluid connector marking of the first fluid connector. The first fluid conduit is coupled with the first fluid connector. The second fluid conduit marking of the second fluid conduit is aligned with the second fluid connector marking of the second fluid connector. The second fluid conduit is coupled with the second fluid connector. In particular embodiments, an electrical lead of the controller is provided which has an electrical lead marking thereon. An electrical connector of the injector is also provided which has an electrical connector marking defined thereon. The electrical lead marking of the electrical lead is aligned with the electrical connector marking of the electrical connector. The electrical lead is then coupled to the electrical connector.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to system and methods for identifying a coupling relationship between fluid conduits and fluid connectors and/or electrical leads and electrical connectors included in an aftertreatment system. In various embodiments, the systems and methods described herein include corresponding visual markings defined on fluid conduits and fluid connectors, and/or electrical leads and electrical connectors included in reductant insertion assemblies of an aftertreatment system.

Embodiments of the systems and methods described herein may provide several benefits include, for example: (1) allowing identification of a coupling relationship between individual fluid conduits and fluid connectors and/or electrical leads and electrical leads included among hundreds of fluid conduits/fluid connectors and/or electrical leads/electrical connectors included in aftertreatment systems that can include a plurality of reductant insertion assemblies; (2) reducing costs which can be associated with providing unique geometrical coupling or unique geometric poke-yoke between corresponding fluid conduits/fluid connectors and/ or electrical leads/electrical connectors; and (3) allowing mounting or installation or multiple reductant insertion assemblies on aftertreatment systems in a rapid and facile fashion, thereby reducing assembly time.

Figure 1:
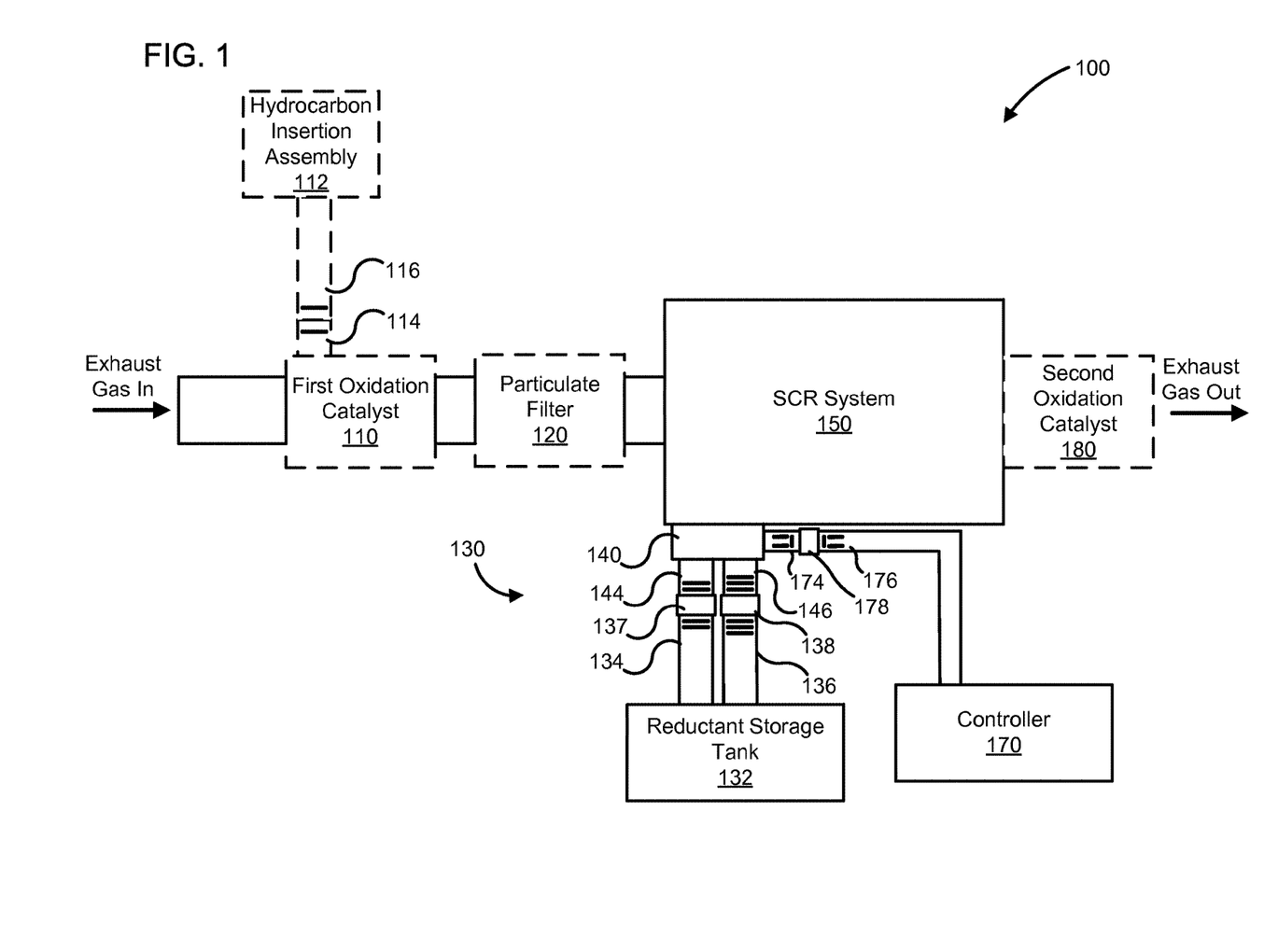
FIG. 1 is a schematic block diagram of an aftertreatment system according to an embodiment.

FIG. 1 s a schematic illustration of a side view of an aftertreatment system 100, according to an embodiment. The aftertreatment system includes an SCR system 150, a reductant insertion assembly 130, a controller 170, and optionally a first oxidation catalyst 110, a hydrocarbon insertion assembly 112, a particulate filter 120 and a second oxidation catalyst 180. The aftertreatment system 100 is configured to receive an exhaust gas (e.g., a diesel exhaust gas) generated by an IC engine (e.g., a diesel engine) and decompose constituents of the exhaust gas.

The SCR system 150 is configured to receive and decompose constituents (e.g., NOx gases) of the exhaust gas (e.g., diesel exhaust gas) flowing through the aftertreatment system. The SCR system 150 is fluidly coupled with the reductant insertion assembly 130 and configured to receive a reductant (e.g., a diesel exhaust fluid such as an aqueous urea solution) therefrom. The reductant can be formulated to facilitate decomposition of the constituents (e.g., NOx gases) of the exhaust gas. The SCR system 150 includes at least one catalyst. The catalyst is formulated to selectively reduce constituents of the exhaust gas, for example, NOx included in the exhaust gas in the presence of the reductant. Any suitable catalyst can be used such as, for example, platinum, palladium, rhodium, cerium, iron, manganese, copper, vanadium based catalysts (including combinations thereof).

The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalyst. Such washcoat materials can include, for example, aluminum oxide, titanium dioxide, silicon dioxide, any other suitable washcoat material, or a combination thereof. The exhaust gas can flow over and about the catalyst such that any NOx gases included in the exhaust gas are further reduced to yield an exhaust gas which is substantially free of carbon monoxide and NOx gases.

The reductant insertion assembly 130 includes a reductant storage tank 132 and an injector 140 and is fluidly coupled to the SCR system 150. The reductant storage tank 132 is configured to contain a reductant, for example, a diesel exhaust fluid (e.g., ammonia, or an aqueous urea solution such as the diesel exhaust fluid available under the trade name ADBLUE®). The injector 140 is positioned on a housing of the SCR system 150, for example through the housing of the SCR system 150. The injector 140 is configured to receive the reductant from the reductant storage tank 132, for example via a pump (not shown) included in the reductant insertion assembly 130 and insert the reductant into the SCR system 150 in the form of a jet, mist or spray. The reductant insertion assembly 130 can include any other components such as valves, nozzles, pumps or any other suitable components for communicating the reductant from the reductant storage tank 132 to the injector 140 and into the SCR system 150.

The injector 140 includes a first fluid connector 144 and a second fluid connector 146. For example, the first fluid connector 144 can be configured to receive reductant and the second fluid connector 146 can be configured to expel unused, extra or overflow reductant out from the injector 140. In other words, the first fluid connector 144 serves as a reductant inlet and the second fluid connector 146 serves as a reductant outlet. A first fluid connector marking is defined on the first fluid connector 144, and a second fluid connector marking is defined on the second fluid connector 146 as shown in FIG. 1. The second fluid connector marking is different from the first fluid connector marking. For example, the first fluid connector marking includes two horizontal lines, while the second fluid connector marking includes three horizontal lines. Any other first fluid connector marking or second fluid connector marking can also be used, for example any of the markings shown in FIGS. 3A-L or any other markings described herein.

The reductant storage tank 130 includes a first fluid conduit 134 fluidly coupled to the first fluid connector 144 of the injector 140, and a second fluid conduit 136 fluidly coupled to the second fluid connector 146 of the injector 140. The first fluid conduit 134 is configured to deliver the reductant to the injector 140 via the first fluid connector 144, and the second fluid conduit 136 is configured to communicate any unused, extra or overflow reductant from the injector 140 back to the reductant storage tank 130.

A first fluid conduit marking is defined on the first fluid conduit 134 and a second fluid conduit marking is defined on the second fluid conduit 136, which is different from the first fluid conduit marking. The first fluid conduit marking corresponds to the first fluid connector marking, thereby identifying a coupling relationship between the first fluid conduit 134 and the first fluid connector 144. Furthermore, the second fluid conduit marking corresponds to the second fluid connector marking, thereby identifying a coupling relationship between the second fluid conduit 136 and the second fluid connector 146. For example, the first fluid conduit marking includes two horizontal lines which are the same as the first fluid connector marking. Moreover, the second fluid conduit marking includes three horizontal lines, which are the same as the second fluid connector marking. In one embodiment, the first fluid conduit marking is the same as the first fluid connector marking, and the second fluid conduit marking is the same as the second fluid connector marking.

In this manner, a user can rapidly match the first fluid conduit marking with the corresponding first fluid connector marking to identify the coupling relationship and couple the corresponding first fluid conduit 134 with the first fluid connector 144. Similarly, a user can rapidly match the second fluid conduit marking with the corresponding second fluid connector marking to identify the coupling relationship and couple the corresponding first fluid conduit 134 with the first fluid connector 146. This avoids incorrect identification and coupling between fluid conduits and connectors. For example, the aftertreatment system 100 can include any number of reductant insertion assemblies with multiple fluid conduits and connectors. Unique visual markings on corresponding fluid conduits and fluid connectors can allow rapid identification of a coupling relationship between the corresponding fluid conduits and connectors to allow rapid assembly and reduce or minimize assembly errors.

In particular embodiments, the first fluid conduit 134 includes a first fluid conduit coupling 137 and the second fluid conduit 136 includes a second fluid conduit coupling 138. The first fluid conduit coupling 137 is geometrically sized and shaped for coupling exclusively with the first fluid connector 144, and the second fluid conduit coupling 138 is exclusively sized and shaped for coupling with the second fluid connector 146 Furthermore, a length of each of the first fluid conduit 134 and the second fluid conduit 136 can be precisely defined to mitigate risk of incorrect attachment. In other words, geometric poke-yoke can also be provided between the first fluid conduit coupling 137 of the first fluid conduit 134 and the first fluid connector 144, and between the second conduit coupling 138 of the second fluid conduit 136 and the second fluid connector 146.

The injector 140 also includes at least one electrical connector 174. An electrical connector marking is defined on the electrical connector 174 as shown in FIG. 1. For example, the electrical connector marking includes a unique combination of horizontal and vertical lines as shown in FIG. 1. While shown as including only the electrical connector 174, any number of electrical connectors can be included in the injector 140 such that a unique electrical connector marking is defined on each electrical connector.

The controller 170 is communicatively coupled to the reductant insertion assembly 130, as described herein. The controller 170 can include a processor (e.g., a microcontroller) to control the operation of the injector 140 or any other components of the reductant insertion assembly 130, for example actuate the injector 140, control the amount of reductant inserted into the SCR system 150, control the timing of reductant insertion, and/or any other control or sensing function. In particular embodiments, the controller 170 can also be configured to receive and interpret data from temperature sensors, NOx sensors, oxygen sensors and/or ammonia sensors, each of which can be included in the aftertreatment system 100.

The controller 170 includes an electrical lead 176 configured to be coupled to the electrical connector 174 of the injector 140 to communicatively couple the controller 170 to the injector 140 and, thereby the reductant insertion assembly 130. An electrical lead marking is defined on the electrical lead 176 as shown in FIG. 1. For example, the electrical lead marking includes a unique series of horizontal and vertical lines as shown in FIG. 1. The electrical lead marking corresponds to the electrical connector marking, thereby identifying a coupling relationship between the electrical lead 176 and the electrical connector 174. Thus, the user can easily identify simply by observing the electrical connector marking electrical lead marking that a coupling relationship exists therebetween. This allows rapid assembly and reduction in assembly errors as described before herein with reference to the first fluid conduit 134 and the first fluid connector 144, and the second fluid conduit 136 and the second fluid connector 146. In one embodiment, the electrical lead marking is the same as the electrical connector marking.

In particular embodiments, the electrical lead 176 also includes an electrical lead coupling 178 geometrically sized and shaped to exclusively mate with the electrical connector 174. Furthermore, a length of the electrical lead 176 can be precisely defined or adjusted to only allow the electrical lead coupling 178 to reach the electrical connector and mitigate risk of incorrect attachment.

In various implementations, the first fluid connector marking, the first fluid conduit marking, the second fluid connector marking, the second fluid conduit marking, the electrical connector marking and/or the electrical lead marking can include a unique series of horizontal and/or vertical lines. FIGS. 3A-H show various non-limiting examples of combinations of horizontal and/or vertical lines which can be used as the marking defined on any of the components described herein. In other implementations, the first fluid connector marking, the first fluid conduit marking, the second fluid connector marking, the second fluid conduit marking, the electrical connector marking and/or the electrical lead marking can include a unique geometric shape defined thereon. For example, FIGS. 3I-L show various non-limiting examples of geometric which can be used as the marking defined on any of the components described herein. Furthermore, multiple geometric shapes can also be used to define a unique geometric pattern.

In particular embodiments, the first fluid connector marking includes a first shape first portion of a first geometric shape and the first fluid conduit marking includes a first shape second portion of the first geometric shape. Coupling of the first fluid connector 144 to the first fluid conduit 134 places the first fluid connector marking and the first fluid conduit marking adjacent to each other to define the first geometric shape. As used herein, the term "adjacent" refers to being positioned near to, positioned in an abutting relationship or positioned in the same plane and/or along the same axis.

Figure 4:
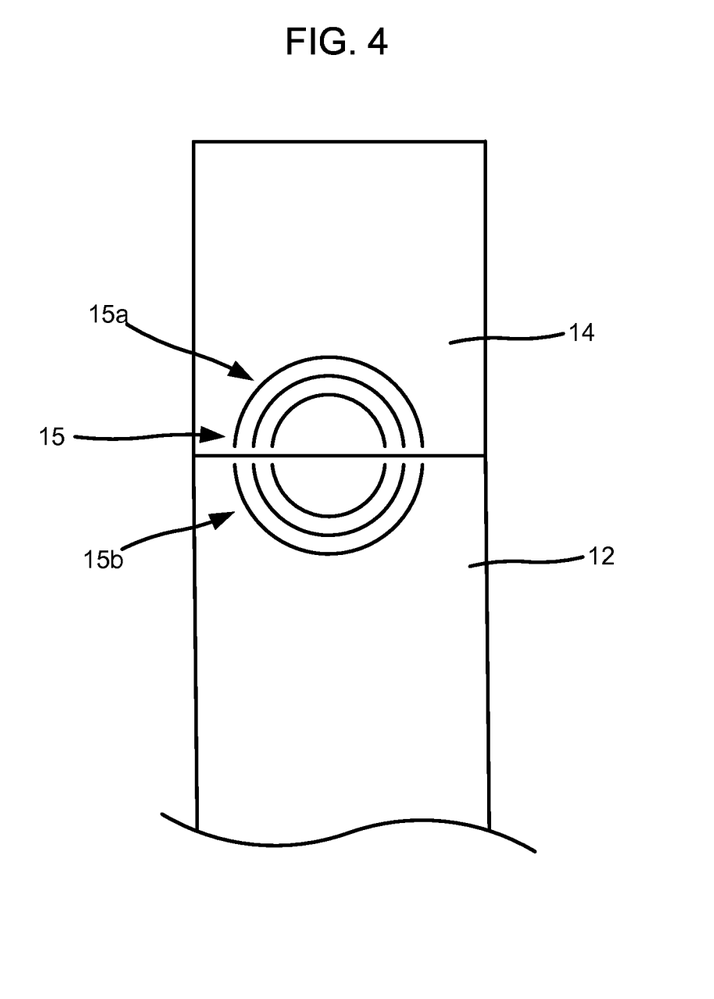
FIG. 4 is another example of a fluid connector with a first shape first portion of a first geometric shape defined thereon, and a portion of fluid conduit with a first shape second portion of the first geometric shape defined thereon, to identify a coupling relationship therebetween.

For example, FIG. 4 shows a fluid connector 14 coupled to a fluid conduit 12, which can, for example, include the first fluid connector 144 and the first fluid conduit 134. The fluid connector 14 include a first shape first portion 15a (a plurality of concentric half circles) of a first geometric shape 15 defined thereon. The fluid conduit 12 includes a first shape second portion 15b (a plurality of concentric half circles oriented 180 degrees to the plurality of half circles of the first shape first portion) of the first geometric shape 15 defined thereon. As shown in FIG. 4, coupling of the fluid conduit 12 with the fluid connector 14 completely defines the first geometric shape 15 (i.e., a plurality of concentric circles). It is to be understood that the geometric shape 15 is just one example and any other geometric shape can be used such that a first portion of the geometric shape is defined on the fluid connector 14 (e.g., the first fluid connector 144) and a second portion of the geometric shape is defined on the fluid conduit 12 (e.g., the first fluid conduit 134).

Similarly, the second fluid connector marking can includes second shape first portion of a second geometric shape and the second fluid conduit marking can include a second shape second portion of the second geometric shape. The second geometric shape can be the same or different from the first geometric shape. Coupling of the second fluid conduit with the second fluid connector aligns the second shape first portion with the second shape second portion to completely define the second geometric shape.

In still other embodiments, the electrical connector marking includes a third shape first portion of a third geometric shape and the second fluid conduit 136 includes a third shape second portion of the third geometric shape. The third geometric shape can be different from the first geometric shape and the second geometric shape. Coupling of the second fluid connector 146 to the second fluid conduit 136 places the second fluid connector marking and the second fluid conduit marking adjacent to each other to define the second geometric shape.

Any of the markings defined herein can be in gray scale or color. In particular embodiments, color coding separately or in addition with the horizontal and/or vertical markings and/or geometric shapes can be used.

In some embodiments, a first oxidation catalyst 110 is positioned upstream of the SCR system 150. The first oxidation catalyst 110 can include, for example a diesel oxidation catalyst configured to decompose carbon monoxide and/or unburnt hydrocarbons included in the exhaust gas. The first oxidation catalyst 110 includes a third fluid connector 114 including a third fluid connector marking defined thereon, as shown in FIG. 1. The third fluid connector marking is different from the first fluid connector marking and the second fluid connector marking.

A hydrocarbon insertion assembly 112 is fluidly coupled to the first oxidation catalyst 110 and is configured to insert hydrocarbons into the first oxidation catalyst 110, for example to regenerate the first oxidation catalyst 110. The hydrocarbon insertion assembly 112 includes a third fluid conduit 116. A third fluid conduit marking is defined on the third fluid conduit 116, as shown in FIG. 1. The third fluid conduit marking is different from the first fluid conduit marking and the second fluid conduit marking. The third fluid conduit marking corresponds to the third fluid connector marking thereby identifying a coupling relationship therebetween. In one embodiment, the third fluid conduit marking is the same as the third fluid connector marking. In various implementations, the third fluid conduit marking and the third fluid connector marking can include any of the markings defined herein (e.g., the markings shown in FIGS. 3A-L or FIG. 4).

In further embodiments, a particulate filter 120 can be positioned upstream of the SCR system 150 and downstream of the first oxidation catalyst 110. The particulate filter can include, for example a diesel particulate filer or a selective catalytic reduction filter, and configured to filter particulate matter (e.g., carbon particles or soot) included in the exhaust gas. A second oxidation catalyst 180 can also be positioned downstream of the SCR system 150. In various embodiments, the second oxidation catalyst 180 can be substantially the same as the first oxidation catalyst 110 (e.g., include a diesel oxidation catalyst). In other embodiments, the second oxidation catalyst 180 can include an ammonia oxidation catalyst configured to decompose any residual ammonia, for example produced by the decomposition of the reductant inserted into the SCR system 150, included in the exhaust gas.

Figure 2:
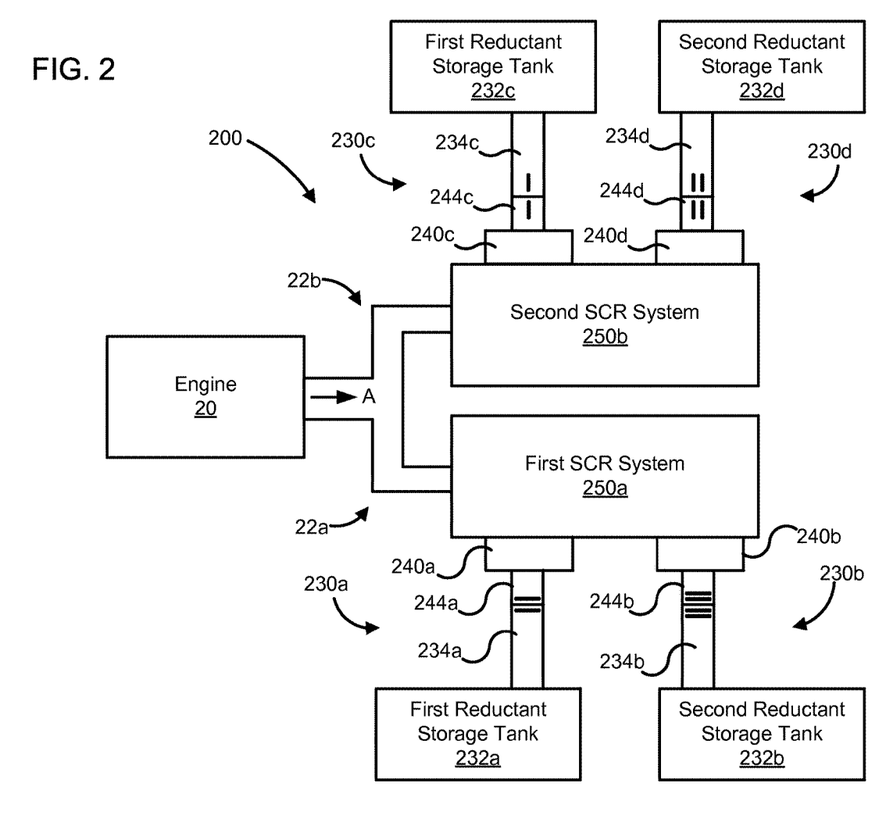
FIG. 2 is a schematic block diagram of another embodiment of an aftertreatment system.
Figure 3A:
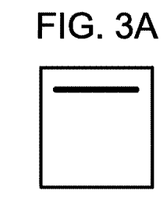
FIGS. 3A-L are various non-limiting examples of markings that can be used on fluid conduits, fluid connectors, electrical leads and/or electrical connectors for identifying a coupling relationship therebetween.
Figure 3B:
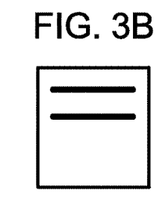
Figure 3C:
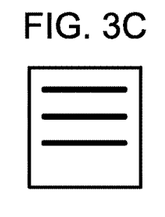
Figure 3D:
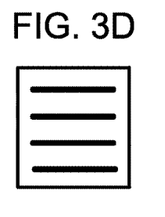
Figure 3E:
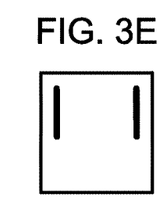
Figure 3F:
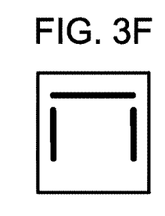
Figure 3G:
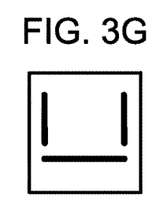
Figure 3H:
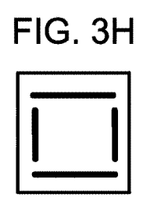
Figure 3I:
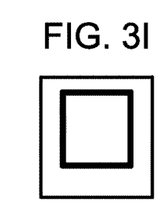
Figure 3J:
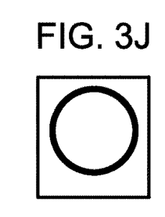
Figure 3K:
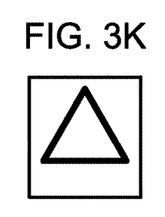
Figure 3L:
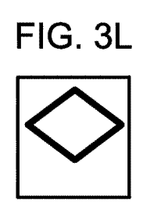

Defining corresponding markings on fluid connectors and fluid conduits, and/or electrical connectors and electrical leads can be particularly beneficial in rapid and accurate identification of a coupling relationship between components of an aftertreatment system that include multiple SCR system banks and a plurality of reductant insertion assemblies included in each bank. For example, FIG. 2 shows another embodiment of an aftertreatment system 200. The aftertreatment system 200 is configured to receive an exhaust gas (e.g., a diesel exhaust gas) from an engine 20 (e.g., a diesel engine) and decompose constituents of the exhaust gas. The aftertreatment system 200 includes a first bank 22a for receiving a first portion of the exhaust gas produced by the engine 20, and a second bank 22b for receiving a second portion of the exhaust gas produced by the engine 20.

The first bank 22a includes a first SCR system 250a configured to receive the first portion of the exhaust gas and decompose constituents included in the first portion of the exhaust gas. The first SCR system 250a can be substantially similar to the SCR system 150 described herein, and therefore not described in further detail herein. A first reductant insertion assembly 230a and a second reductant insertion assembly 230b is fluidly coupled to the first SCR system 250a. The first reductant insertion assembly 230a includes a first reductant storage tank 232a and a first injector 240a. The first injector 240a is fluidly coupled to the first SCR system 250a and configured to insert reductant received from the first reductant storage tank 232a into the first SCR system 250a.

The first injector 240a includes a first fluid connector 244a including a first fluid connector marking defined thereon. The first reductant storage tank 234a includes a first fluid conduit 234a fluidly coupled to the first fluid connector 244a. The first fluid conduit 234a includes a first fluid conduit marking defined thereon. The first fluid conduit marking corresponds to the first fluid connector marking to identify a coupling relationship between the first fluid connector 244a and the first fluid conduit 234a, as described before. In one embodiment, the first fluid conduit marking can be the same as the first fluid connector marking.

The second reductant insertion assembly 230b includes a second reductant storage tank 232b and a second injector 240b. The second injector 240b is also fluidly coupled to the first SCR system 250a and configured to insert reductant received from the second reductant storage tank 232b into the first SCR system 250a. The second injector 240b includes a second fluid connector 244b including a second fluid connector marking defined thereon, which is different from the first fluid connector marking of the first fluid connector 244a.

The second reductant storage tank 234b includes a second fluid conduit 234b fluidly coupled to the second fluid connector 244b. The second fluid conduit 234a includes a second fluid conduit marking defined thereon which is different from the first fluid conduit marking of the first fluid conduit 234a. The second fluid conduit marking corresponds to the second fluid connector marking to identify a coupling relationship between the second fluid connector 244b and the second fluid conduit 234b, as described before.

The second bank 22b includes a second SCR system 250b configured to receive the second portion of the exhaust gas and decompose constituents included in the second portion of the exhaust gas. The second SCR system 250b can be substantially similar to the SCR system 150 described herein, and therefore not described in further detail herein. A third reductant insertion assembly 230c and a fourth reductant insertion assembly 230d is fluidly coupled to the second SCR system 250b. The third reductant insertion assembly 230b includes a third reductant storage tank 232b and a third injector 240c. The third injector 240c is fluidly coupled to the second SCR system 250b and configured to insert reductant received from the third reductant storage tank 232c into the second SCR system 250b.

The third injector 240c includes a third fluid connector 244c including a third fluid connector marking defined thereon which is different from each of the first fluid connector marking and the second fluid connector marking. The third reductant storage tank 234c includes a third fluid conduit 234c fluidly coupled to the third fluid connector 234c. The third fluid conduit 234c includes a third fluid conduit marking defined thereon different from each of the first fluid conduit marking and the second fluid conduit marking. The third fluid conduit marking corresponds to the third fluid connector marking to identify a coupling relationship between the third fluid connector 244c and the third fluid conduit 234c, as described before. In one embodiment, the third fluid conduit marking can be the same as the third fluid connector marking.

Furthermore, the fourth reductant insertion assembly 230d includes a fourth reductant storage tank 232d and a fourth injector 240d. The fourth injector 240d is also fluidly coupled to the second SCR system 250b and configured to insert reductant received from the fourth reductant storage tank 232d into the fourth SCR system 250d. The fourth injector 240d includes a fourth fluid connector 244d including a fourth fluid connector marking defined thereon, which is different from each of the first fluid connector marking, the second fluid connector marking and the third fluid connector marking.

The fourth reductant storage tank 234d includes a fourth fluid conduit 234d fluidly coupled to the fourth fluid connector 244d. The fourth fluid conduit 234d includes a fourth fluid conduit marking defined thereon which is different from each of the first fluid conduit marking, the second fluid conduit marking and the third fluid conduit marking. The fourth fluid conduit marking corresponds to the fourth fluid connector marking to identify a coupling relationship between the fourth fluid connector 244d and the fourth fluid conduit 234d, as described before.

In this manner, using the markings defined on the fluid conduits and fluid connectors, a plurality of fluid conduits included in a multiplicity of reductant insertion assemblies of an aftertreatment system can be matched with their corresponding fluid connectors and coupled thereto. In addition, geometric poke-yoke, for example providing geometrically mating connectors or sizing the lengths of the conduits, can also be provided as an additional measure to ensure proper matching and coupling of fluid conduits to corresponding fluid connectors.

While not shown herein, one or more controllers (e.g., the controller 170) can also be included in the aftertreatment system 200. The one or more controllers can include a plurality of electrical leads for coupling or interfacing with corresponding electrical connectors (not shown) provided on each of the injectors 240a-d to communicatively couple the one or more controllers with the injectors or otherwise the reductant insertion assemblies 230a-d. In such embodiments, each of the plurality of electrical leads and electrical connectors can also include unique electrical lead markings and electrical connector markings, respectively to identify a coupling relationship therebetween.

Figure 5:
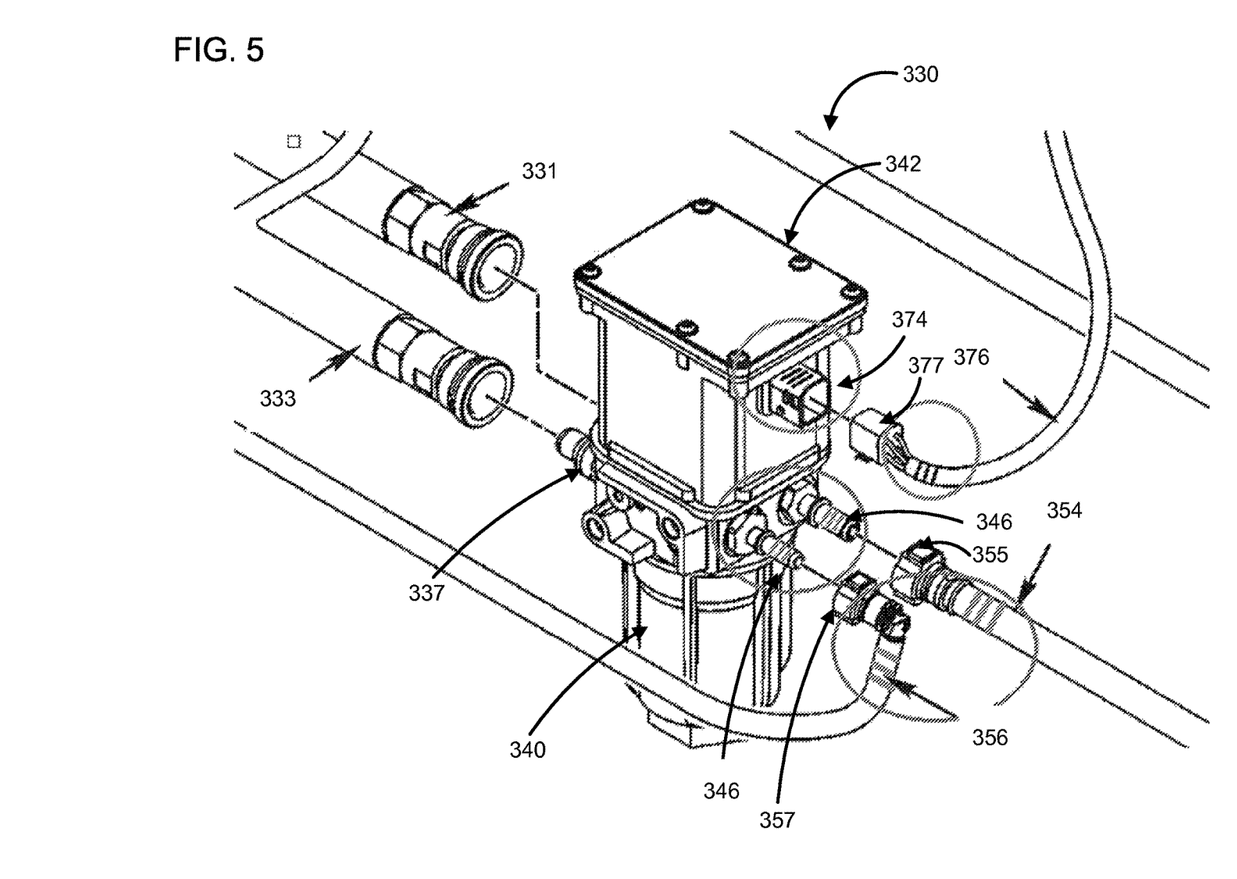
FIG. 5 is a perspective view of one embodiment of a reductant insertion assembly that includes fluid conduits, fluid connectors, electrical leads and electrical connectors including a marking defined thereon for identifying a coupling relationship therebetween.

FIG. 5 shows a portion of a reductant insertion assembly 330 according to another embodiment. The reductant insertion assembly 330 includes an injector 340 which can include pumps, nozzles, valves etc. for communicating fluid to an SCR system (e.g., the SCR system 150, 250a or 250b). Electronic circuitry 342 is also included in injector 340 which is configured to be communicatively coupled to a controller (e.g., the controller 170).

As shown in FIG. 5, the reductant insertion assembly 330 includes a first fluid tube 331 and a second fluid tube 333. For example, the first fluid tube 331 can be configured to deliver reductant from a reductant storage tank (not shown) to the injector 340, and the second fluid tube 333 can be configured to communicate extra, unused or overflow reductant back to the reductant storage tank form the injector 340. Each of the first fluid tube 331 and the second fluid tube 333 include couplers geometrically shaped and sized to include couplers which are geometrically shaped and sized be coupled to a corresponding first fluid port (not shown) and a second fluid port 337 (i.e., geometric poke-yoke exists between the first fluid tube 331 and the first fluid port, and between the second fluid tube 333 and the second fluid port 337).

The injector 340 includes a first injector fluid connector 344 and a second injector fluid connector 346. A first injector fluid connector marking is defined on the first injector fluid connector 344. FIG. 5 shows the first injector fluid connector marking including 3 parallel horizontal lines but any other marking can be defined on the first injector fluid connector 344, as described before herein. A second injector fluid connector marking is defined on the second injector fluid connector 346. The second injector fluid connector marking is shown in FIG. 5 to be the same as the first injector fluid connector markings but in other embodiments, the second injector fluid connector marking can be different from the first injector fluid connector marking.

The reductant insertion assembly 330 also includes a first injector fluid conduit 354 and a second injector fluid conduit 356. The first injector fluid conduit 354 is configured to be coupled to the first injector fluid connector 344, and the second injector fluid conduit 356 is configured to be coupled to the second injector fluid connector 354. The first injector fluid conduit 354 can be configured to deliver a reductant (e.g., a diesel exhaust fluid) from the injector to an SCR system (e.g., the SCR system 150, 250*a* or 250*b*), for example via a nozzle positioned on the SCR system. Furthermore, the second injector fluid conduit 356 can be configured to return any unused, extra or overflow reductant from the nozzle to the injector 340 for delivery back to the reductant storage tank via the second fluid tube 333.

A first injector fluid conduit marking is defined on the first injector fluid conduit 354, and a second injector fluid conduit marking is defined on the second injector fluid conduit 356. The first injector fluid conduit marking corresponds to the first injector fluid connector marking, thereby identifying a coupling relationship between the first injector fluid conduit 354 and the first injector fluid connector 344. Furthermore, the second injector fluid conduit marking corresponds to the second injector fluid connector marking, thereby identifying a coupling relationship between the second injector fluid conduit 356 and the second injector fluid connector 346.

As shown in FIG. 5, the first injector fluid conduit marking is the same as the first injector fluid connector marking, and the second injector fluid conduit marking is the same as the second injector fluid connector marking. In other embodiments, the markings can be different or can include any other marking described herein. The first injector fluid conduit 354 includes a first injector fluid conduit coupling 355 geometrically sized and shaped to be coupled to the first injector fluid connector 354. The second injector fluid conduit 356 also includes a second injector fluid conduit coupling 357 geometrically sized and shaped to be coupled to the second injector fluid connector 356. Furthermore, each of the first injector fluid conduit 354 and the second injector fluid conduit 356 can have a precise length so that the first injector fluid conduit coupling 355 and the second injector fluid conduit coupling 357 is positioned proximal to the first injector fluid connector 344 and the second injector fluid connector 346, respectively when the first injector fluid conduit 354 and the second injector fluid conduit 356 are routed from the SCR system to the injector 340.

The injector also includes an injector electrical connector 374. The injector electrical connector 374 can be configured to provide communicative coupling of the electronic circuitry 342 of the injector 340 to a controller (e.g., the controller 170). An injector electrical connector marking is defined on the injector electrical connector 374. The injector electrical connector 374 is configured to be coupled to an injector electrical lead 376 to communicatively couple the injector 340 to a controller. The injector electrical lead 376 has an injector electrical lead marking defined thereon. The injector electrical marking corresponds to the injector electrical connector marking, thereby identifying a coupling relationship between the injector electrical lead 376 and the injector electrical connector 374. Furthermore, the injector electrical lead 376 includes an injector electrical lead coupling 377 geometrically sized and shaped to be coupled to the injector electrical connector 374. Also the injector electrical lead 376 can have a precise length so that the injector electrical lead 376 is positioned proximal to the injector electrical connector 374 when the injector electrical lead 376 is routed from the controller to the injector 340.

Figure 6:
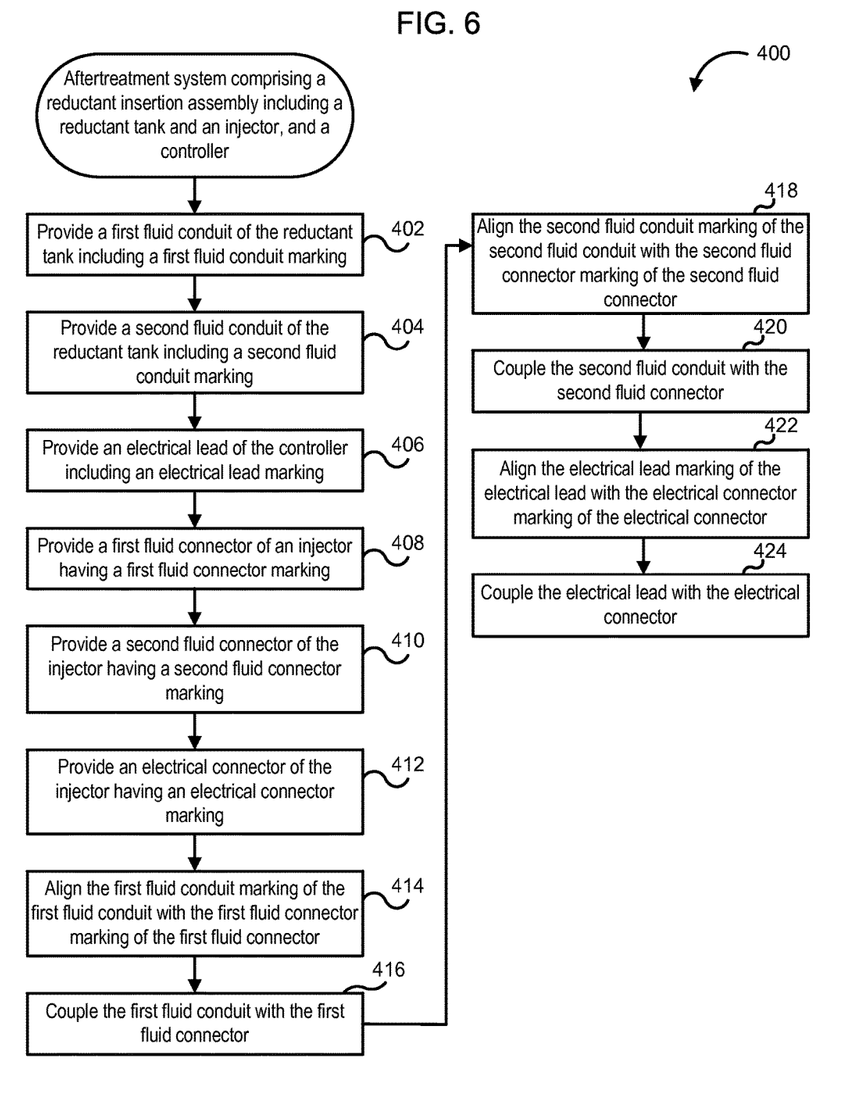
FIG. 6 is a schematic flow diagram of an exemplary method for identifying a coupling relationship between fluid conduits and fluid connectors, and electrical leads and electrical connectors included in an aftertreatment system using visual markings defined thereon.

FIG. 6 is a schematic flow diagram of an example method 400 for facilitating fluid coupling of various components of a reductant insertion assembly, and electrical coupling of a controller included in an aftertreatment system such as, for example the aftertreatment system 100 or 200. The method includes providing a first fluid conduit having a first fluid conduit marking defined thereon at 402. For example, the first fluid conduit can include the first fluid conduit 134, 234*a* or 354, having the first fluid conduit marking defined thereon as described above.

A second fluid conduit having a second fluid conduit is provided having a second fluid conduit marking defined thereon at 404. The second fluid conduit marking is different than the first fluid conduit marking. For example, the second fluid conduit can include the second fluid conduit 136, 236*b* or 356 and include the second fluid conduit marking as described before herein. An electrical lead of the controller is provided which has electrical lead markings thereon at 406. For example, the electrical lead can include the electrical lead 176 or 376 having the electrical lead marking defined thereon, as described before herein.

A first fluid connector of the injector is provided which has first fluid connector marking defined thereon at 408. A second fluid connector of the injector is provided which has as second fluid connector marking defined thereon at 410. The second fluid connector marking is different from the first fluid connector marking. Furthermore, an electrical connector of the injector is provided which has an electrical injector marking defined thereon at 412. For example, the injector can include the injector 140, 340 or any other injector described herein which includes the first fluid connector (e.g., the first fluid connector 144 or 344) having the first fluid connector marking, the second fluid connector (e.g., the second fluid connector 146 or 346) having the second fluid connector marking, and the electrical connector (e.g., the electrical connector 174 or 374) having the electrical connector marking defined thereon.

The first fluid conduit marking of the first fluid conduit is aligned with the first fluid connector marking of the first fluid connector at 414. The first fluid conduit is coupled with the first fluid connector at 416. For example, the first fluid conduit marking corresponds to the first fluid connector marking (e.g., the first fluid conduit marking and the first fluid connector marking are the same) and identify a coupling relationship between the first fluid conduit and the first fluid connector. The first fluid conduit is aligned with the first fluid connector to identify the coupling relationship and perform the coupling.

The second fluid conduit marking of the second fluid conduit is aligned with the second fluid connector marking of the second fluid connector at 418. The second fluid conduit is coupled with the second fluid connector at 420. For example, the second fluid conduit marking corresponds to the second fluid connector marking (e.g., the second fluid conduit marking and the second fluid connector marking are the same) and identify a coupling relationship between the second fluid conduit and the second fluid connector. The second fluid conduit is aligned with the second fluid connector to identify the coupling relationship and perform the coupling.

The electrical lead marking of the electrical lead is aligned with the electrical connector marking of the electrical connector at 422. The electrical lead is coupled to the electrical connector at 424. For example, the electrical lead marking corresponds to the electrical connector marking (e.g., the electrical lead marking and the electrical connector marking are the same) and identify a coupling relationship between the electrical lead (e.g., the electrical lead 176 and the electrical connector 174). The electrical lead is aligned with the electrical connector to identify the coupling relationship and perform the coupling.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various embodiments presented herein are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system comprising:
   a selective catalytic reduction system including at least one catalyst configured to decompose constituents of the exhaust gas; and
   at least one reductant insertion assembly coupled to the selective catalyst reduction system, the at least one reductant insertion assembly including:
      an injector including:
         a first fluid connector,
         a second fluid connector,
         a first fluid connector marking defined on the first fluid connector and
         a second fluid connector marking defined on the second fluid connector, the second fluid connector marking being different from the first fluid connector marking;
      at least one reductant storage tank;
      a first fluid conduit having a first end coupled to the at least one reductant storage tank and a second end couplable to the first fluid connector;
      a second fluid conduit having a first end coupled to the at least one reductant storage tank and a second end couplable to the second fluid connector;
      a first fluid conduit marking defined on the first fluid conduit; and
      a second fluid conduit marking defined on the second fluid conduit, the second fluid conduit marking being different from the first fluid conduit marking,
      wherein the first fluid conduit and the second fluid conduit have lengths from the first ends to the second ends thereof such that, when the first ends of the first and second fluid conduits are coupled to the at least one reductant storage tank, the first fluid conduit is couplable to the first fluid connector but not the second fluid connector due to the length of the first fluid conduit, and the second fluid conduit is couplable to the second fluid connector but not the first fluid connector due to the length of the second fluid conduit,
   wherein the first fluid conduit marking corresponds to the first fluid connector marking, thereby identifying a coupling relationship therebetween, and
   wherein the second fluid conduit marking corresponds to the second fluid connector marking, thereby identifying a coupling relationship therebetween.

2. The aftertreatment system of claim 1, wherein the injector includes at least one electrical connector, an electrical connector marking defined on the at least one electrical connector, and wherein the aftertreatment system further comprises:
   a controller communicatively coupled with the reductant injector assembly, the controller including an electrical lead, an electrical lead marking defined on the electrical lead,
   wherein the electrical lead marking corresponds to the electrical connector marking, thereby identifying a coupling relationship therebetween.

3. The aftertreatment system of claim 2, wherein the electrical lead includes an electrical lead coupling geometrically sized and shaped to exclusively mate with the electrical connector.

4. The aftertreatment system of claim 2, wherein at least one of the first fluid connector marking, the first fluid conduit marking, the second fluid connector marking, the second fluid conduit marking, the electrical connector marking and the electrical lead marking includes a unique series of horizontal or vertical lines.

5. The aftertreatment system of claim 2, wherein at least one of the first fluid connector marking, the first fluid conduit marking, the second fluid connector marking, the second fluid conduit marking, the electrical connector marking and the electrical lead marking include a unique geometric shape.

6. The aftertreatment system of claim 2, wherein the electrical connector marking includes a third shape first portion of a third geometric shape and the electrical lead marking includes a third shape second portion of the third geometric shape so that coupling of the electrical lead to the electrical connector places the electrical connector marking and the electrical lead marking adjacent to each other to define the third geometric shape.

7. The aftertreatment system of claim 1, wherein the first fluid conduit includes a first fluid conduit coupling and the second fluid conduit includes a second fluid conduit coupling, the first fluid conduit coupling geometrically sized and shaped for coupling exclusively with the first fluid connector, and the second fluid conduit coupling geometrically sized and shaped for coupling exclusively with the second fluid connector.

8. The aftertreatment system of claim 1, wherein the first fluid connector marking is the same as the first fluid conduit marking, and wherein the second fluid connector marking is the same as the second fluid conduit marking.

9. The aftertreatment system of claim 8, wherein the electrical connector marking is the same as the electrical lead marking.

10. The aftertreatment system of claim 1, wherein the first fluid connector marking includes a first shape first portion of a first geometric shape and the first fluid conduit marking includes a first shape second portion of the first geometric shape so that coupling of the first fluid connector to the first fluid conduit places the first fluid connector marking and the first fluid conduit marking adjacent to each other to define the first geometric shape, and
 wherein the second fluid connector marking includes a second shape first portion of a second geometric shape and the second fluid conduit marking includes a second shape second portion of the second geometric shape so that coupling of the second fluid connector to the second fluid conduit places the second fluid connector marking and the second fluid conduit marking adjacent to each other to define the second geometric shape.

11. The aftertreatment system of claim 1, further comprising:
 a first oxidation catalyst positioned upstream of the selective catalytic reduction system, the oxidation catalyst including a third fluid connector, a third fluid connector marking defined on the third fluid connector, the third fluid connector marking different from the first fluid connector marking and the second fluid connector marking;
 a hydrocarbon insertion assembly including a third fluid conduit, a third fluid conduit marking defined on the third fluid conduit, the third fluid conduit marking different than the first fluid conduit marking and the second fluid conduit marking,
 wherein the third fluid conduit marking corresponds to the third fluid connector marking, thereby identifying a coupling relationship therebetween.

12. A reductant insertion assembly for inserting a reductant into an aftertreatment system, comprising:
 an injector including:
  a first injector fluid connector,
  a second injector fluid connector,
  a first injector fluid connector marking defined on the first injector fluid connector, and
  a second injector fluid connector marking defined on the second injector fluid connector, the second injector fluid connector marking being different from the first injector fluid connector marking;
 a first injector fluid conduit having a first end couplable to an SCR system, and a second end couplable to the first injector fluid connector,
 a second injector fluid conduit having a first end couplable to the SCR system, and a second end couplable to the second injector fluid connector;
 a first injector fluid conduit marking defined on the first injector fluid conduit; and
 a second injector fluid conduit marking defined on the second injector fluid conduit, the second injector fluid conduit marking being different from the first injector fluid conduit marking,
 wherein the first injector fluid conduit and the second injector fluid conduit have lengths from the first ends to the second ends thereof such that, when the first ends of the first and second injector fluid conduits are coupled to the SCR system, the first injector fluid conduit is couplable to the first injector fluid connector but not the second injector fluid connector due to the length of the first injector fluid conduit, and the second injector fluid conduit is couplable to the second injector fluid connector but not the first injector fluid connector due to the length of the second injector fluid conduit,
 wherein the first injector fluid conduit marking corresponds to the first injector fluid connector marking, thereby identifying a coupling relationship therebetween, and
 wherein the second injector fluid conduit marking corresponds to the second injector fluid connector marking, thereby identifying a coupling relationship therebetween.

13. The reductant insertion assembly of claim 12, wherein the injector includes at least one injector electrical connector, an injector electrical connector marking defined on the at least one injector electrical connector, the at least one injector electrical connector configured to be coupled to an injector electrical lead having an injector electrical lead marking defined thereon,
 wherein the injector electrical lead marking corresponds to the injector electrical connector marking, thereby identifying a coupling relationship therebetween.

14. The reductant insertion assembly of claim 13, wherein the injector electrical lead includes an injector electrical coupling geometrically sized and shaped to exclusively mate with the injector electrical connector.

15. The reductant insertion assembly of claim 13, wherein at least one of the first injector fluid connector marking, the first injector fluid conduit marking, the second injector fluid connector marking, the second injector fluid conduit marking, the injector electrical connector marking and the injector electrical lead marking includes a unique series of horizontal or vertical lines.

16. The reductant insertion assembly of claim 15, wherein the first injector fluid connector marking is the same as the first injector fluid conduit marking, and wherein the second injector fluid connector marking is the same as the second injector fluid conduit marking.

17. The reductant insertion assembly of claim 15, wherein the injector electrical connector marking is the same as the injector electrical lead marking.

18. The reductant insertion assembly of claim 13, wherein at least one of the first injector fluid connector marking, the first injector fluid conduit marking, the second injector fluid connector marking, the second injector fluid conduit marking, the injector electrical connector marking and the injector electrical lead marking includes a unique geometric shape.

19. The reductant insertion assembly of claim 12, wherein the first injector fluid conduit includes a first injector fluid conduit coupling and the second injector fluid conduit includes a second injector fluid conduit coupling, the first injector fluid conduit coupling geometrically sized and shaped for coupling exclusively with the first injector fluid connector, and the second injector fluid conduit coupling geometrically sized and shaped for coupling exclusively with the second injector fluid connector.

\* \* \* \* \*